US008982282B2

(12) United States Patent
Woo

(10) Patent No.: US 8,982,282 B2
(45) Date of Patent: Mar. 17, 2015

(54) DISPLAY APPARATUS AND CHANNEL SEARCHING METHOD THEREOF

(71) Applicant: Samsung Electronics Co., Ltd., Suwon-si (KR)

(72) Inventor: Jun-hee Woo, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 14/248,694

(22) Filed: Apr. 9, 2014

(65) Prior Publication Data

US 2014/0313418 A1 Oct. 23, 2014

(30) Foreign Application Priority Data

Apr. 23, 2013 (KR) .......... 10-2013-0044959

(51) Int. Cl.
*H04N 5/63* (2006.01)
*H04N 5/50* (2006.01)
*H04N 21/426* (2011.01)

(52) U.S. Cl.
CPC ............ *H04N 5/50* (2013.01); *H04N 21/4263* (2013.01)
USPC ........... 348/730; 348/731; 348/732; 348/734; 348/735; 348/711; 348/706; 348/705; 348/460; 348/536; 348/552; 348/570; 348/725; 370/316; 370/315; 370/322; 370/329; 370/341; 370/334; 370/351; 455/3.02; 455/12.1; 455/13.2; 455/13.3; 455/13.4; 455/19; 455/20; 455/25; 455/63.3; 455/427; 455/428; 455/572; 725/9; 725/14; 725/32; 725/38; 725/63; 725/68; 725/133; 725/141

(58) Field of Classification Search
USPC ......... 348/730, 731, 732, 734, 735, 725, 711, 348/705, 706, 460, 536, 552, 570; 455/3.02, 3.2, 12.1, 13.2, 13.3, 13.4, 455/19, 25, 63.3, 427, 428, 572; 370/316, 370/315, 322, 329, 341, 334, 351; 725/9, 725/14, 32, 38, 63, 68, 133, 141
See application file for complete search history.

(56) References Cited

U.S. PATENT DOCUMENTS 6,061,082 A * 5/2000 Park ................................ 725/14
6,430,165 B1 * 8/2002 Arsenault ...................... 370/316
(Continued)

FOREIGN PATENT DOCUMENTS

EP 1924013 5/2008
WO 2007/064125 6/2007

OTHER PUBLICATIONS

Extended European Search Report dated Jul. 15, 2014 in European Patent Application No. 14165452.5.

*Primary Examiner* — Jefferey Harold
*Assistant Examiner* — Mustafizur Rahman
(74) *Attorney, Agent, or Firm* — Staas & Halsey LLP

(57) ABSTRACT

A display apparatus and a method of searching for a channel in the display apparatus includes a plurality of tuners and a plurality of antenna ports respectively connected to the plurality of tuners. The method includes receiving a channel search command; if the channel search command is input, searching for one of the plurality of antenna ports that is connected to a satellite antenna to receive a broadcasting signal, if one of the plurality of antenna ports is connected to the satellite antenna to receive the broadcasting signal, setting one of the plurality of tuners connected to the one antenna port, to a main tuner, and performing a channel search through the tuner set to the main tuner. Therefore, although an antenna port connected to one of the plurality of tuners initially set to a sub tuner, the display apparatus performs a channel search through the corresponding tuner.

17 Claims, 7 Drawing Sheets

(56) References Cited

U.S. PATENT DOCUMENTS

| | | | |
|---|---|---|---|
| 6,741,574 B2* | 5/2004 | Arsenault | 370/316 |
| 7,010,264 B1 | 3/2006 | Nguyen et al. | |
| 7,339,492 B1* | 3/2008 | Alexander | 340/12.53 |
| 8,730,404 B2* | 5/2014 | Daigle et al. | 348/731 |
| 2002/0067437 A1* | 6/2002 | Tsubouchi et al. | 348/725 |
| 2002/0150061 A1* | 10/2002 | Arsenault | 370/326 |
| 2003/0203717 A1* | 10/2003 | Chuprun et al. | 455/12.1 |
| 2004/0055019 A1* | 3/2004 | Marmaropoulos | 725/133 |
| 2005/0134747 A1* | 6/2005 | Seo | 348/732 |
| 2005/0160464 A1* | 7/2005 | Yamaguchi et al. | 725/68 |
| 2005/0168641 A1* | 8/2005 | Seo | 348/565 |
| 2006/0154602 A1* | 7/2006 | Lee | 455/13.3 |
| 2007/0019115 A1* | 1/2007 | Umeda | 348/730 |
| 2007/0049202 A1* | 3/2007 | Kokuzawa | 455/63.3 |
| 2007/0074248 A1* | 3/2007 | Kim | 725/38 |
| 2010/0104292 A1* | 4/2010 | Na et al. | 398/115 |
| 2012/0057651 A1* | 3/2012 | Kim | 375/296 |
| 2012/0192217 A1* | 7/2012 | Jeong et al. | 725/14 |
| 2013/0148026 A1* | 6/2013 | Jeong et al. | 348/570 |

\* cited by examiner

DISPLAY APPARATUS AND CHANNEL SEARCHING METHOD THEREOF

CROSS-REFERENCE TO RELATED APPLICATIONS

This application claims priority benefit under 35 U.S.C. §119 from Korean Patent Application No. 10-2013-0044959, filed on Apr. 23, 2013, in the Korean Intellectual Property Office, the disclosure of which is incorporated herein by reference in its entirety.

BACKGROUND

1. Field

The following description relates to a display apparatus and a channel searching method thereof, and more particularly, to a display apparatus that searches for a channel of a satellite broadcasting signal, and a channel searching method thereof.

2. Description of the Related Art

A display apparatus includes an antenna port that receives a satellite broadcasting signal through a satellite antenna. Therefore, if the antenna port of the display apparatus is connected to the satellite antenna through a satellite cable, a tuner connected to the antenna port searches for preset frequency channels to select a frequency channel through which an effective satellite broadcasting signal is received.

As described above, the display apparatus that receives the satellite broadcasting signal from the satellite antenna through the antenna port may include a plurality of antenna ports. If the display apparatus includes the plurality of antenna ports, one of tuners respectively connected to the antenna ports may be initially set to a main tuner, and the other tuners may be initially set to sub tuners.

Therefore, if the plurality of antenna ports are connected to the satellite antenna through the satellite cable, the tuner that has been initially set to the main tuner among the tuners respectively connected to the plurality of antenna ports searches for preset frequency channels.

However, the antenna port connected to the tuner set to the main tuner is connected to the satellite cable to connect one of the plurality of antenna ports to the satellite antenna through the satellite cable in order to receive the satellite broadcasting signal from the satellite antenna.

For this purpose, before a user connects the satellite cable to one of the plurality of antenna ports, the user checks which antenna port has been connected to the tuner initially set to the main tuner. If the satellite cable is connected to the tuner initially set to the sub tuner, the tuner does not search for the preset frequency channels. Accordingly, the user separates the satellite cable connected to the antenna port connected to the tuner initially set to the sub tuner from the corresponding antennal port and re-connects the satellite cable to another antenna port.

SUMMARY

Additional aspects and/or advantages will be set forth in part in the description which follows and, in part, will be apparent from the description, or may be learned by practice of the invention.

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments describe a search for channels through a corresponding tuner even if an antenna port connected to at least one of a plurality of tuners is connected to a satellite antenna through a satellite cable.

The exemplary embodiments also may automatically change a sub tuner connected to a satellite antenna through a satellite cable into a main tuner.

According to an aspect of the exemplary embodiments, a method of searching for a channel in a display apparatus includes a plurality of tuners and a plurality of antenna ports respectively connected to the plurality of tuners. The method may include receiving a channel search command, if the channel search command is input, searching for one of the plurality of antenna ports that is connected to a satellite antenna to receive a broadcasting signal, if one of the plurality of antenna ports is connected to the satellite antenna to receive the broadcasting signal, setting one of the plurality of tuners connected to the one antenna port to a main tuner, and performing a channel search through the tuner set to the main tuner.

The searching of the one of the plurality of antenna ports may include selecting an arbitrary frequency channel by using the plurality of tuners, searching for one of the plurality of tuners that receives a broadcasting signal through the frequency channel, if one of the plurality of tuners that receives the broadcasting signal is found, disconnecting a power supply to the found tuner, and re-determining whether a broadcasting signal has been received through the tuner from which the power supply has been disconnected.

The plurality of tuners may include first and second tuners, and the setting of one of the plurality of tuners may include if power supplies to the first and second tuners are disconnected, and it is re-determined that the first and second tuners have not received the broadcasting signal, setting one of the first and second tuners as the main tuner.

The setting of one of the plurality of tuners may further include if it is re-determined that a power supply to the first or second tuner has been disconnected, and the broadcasting signal has not been received, setting a tuner not receiving the broadcasting signal as the main tuner.

The method may further include if it is re-determined that a power supply to at least one of the first and second tuners has been disconnected, and the at least one tuner has received the broadcasting signal, searching for a next frequency channel.

The searching for one of the plurality of tuners may further include if one of the plurality of tuners receiving the broadcasting signal is not found, searching for a next frequency channel.

The method may further include if a tuner receiving a broadcasting signal through all frequency channels is not found, outputting a guide message indicating that the antenna ports respectively connected to the plurality of tuners have not been connected to the satellite antenna.

The plurality of tuners may include a first tuner that is defaulted to a main tuner and a second tuner that is defaulted to a sub tuner. The searching for one of the plurality of tuners may include selecting one frequency channel by using the first and second tuners, if a broadcasting signal is received through the first tuner, disconnecting a power supply to the first tuner and re-determining whether the broadcasting signal has been received, if it is determined that the broadcasting signal has been received through the first tuner, selecting a next frequency channel, if it is re-determined that the broadcasting signal has not been received through the first tuner, determining whether the broadcasting signal has been received through the second tuner, if the broadcasting signal has not been received through the second tuner, keeping the first tuner as the main tuner, and if the broadcasting signal has been received through the second tuner, disconnecting a power supply to the second tuner, and re-determining whether the broadcasting signal has been received, and if it is determined that the broadcasting signal has not been received through the second tuner, determining both of the first and second tuners have been connected to the satellite antenna, keeping the first tuner as the main tuner, and if it is re-determined that the broadcasting signal has been received through the second tuner, selecting a next frequency channel.

The searching for the one of the plurality of tuners may include if the broadcasting signal has not been received through the first tuner, and the broadcasting signal has been received through the second tuner, disconnecting a power supply to the second tuner and re-determining whether the broadcasting signal has been received, and if it is re-determined that the broadcasting signal has been received through the second tuner, selecting a next frequency channel. If it is re-determined that the broadcasting signal has not been received through the second tuner, the second tuner may be set to the main tuner.

According to an aspect of the exemplary embodiments, a display apparatus includes a plurality of tuners configured to receive a broadcasting signal, a searcher configured to search for one of a plurality of antenna ports that is connected to a satellite antenna to receive the broadcasting signal according to a channel search command, wherein the plurality of antenna ports are respectively connected to the plurality of tuners, a tuner setter configured to set one of the plurality of tuners connected to the one antenna port to a main tuner if the one of the plurality of antenna ports is connected to the satellite antenna to receive the broadcasting signal, and a controller configured to perform a channel search through the tuner set to the main tuner.

The searcher may include a tuner searcher configured to select an arbitrary frequency channel by using the plurality of tuners to search for one of the plurality of tuners that receives a broadcasting signal through the frequency channel, a power disconnector configured to disconnect a power supply to the found tuner if one of the plurality of tuners receiving the broadcasting signal is found, and a signal sensor configured to re-determine whether the broadcasting signal has been received through the tuner from which the power supply has been disconnected.

The plurality of tuners may include first and second tuners. If power supplies to the first and second tuners are disconnected, and the first and second tuners have not received the broadcasting signal, the tuner setter may set one of the plurality of tuners, which is set to default, to the main tuner.

If a power supply to the first or second tuner is disconnected, and the first or second tuner has not received the broadcasting signal, the tuner setter may set a tuner not receiving the broadcasting signal to the main tuner.

If a power supply to at least one of the first and second tuners is disconnected, and it re-determined that the broadcasting signal has been received, the controller may control the searcher to search for a next frequency channel.

If one of the plurality of tuners receiving the broadcasting signal is not found, the tuner searcher may search for a next frequency channel.

The display apparatus may further include an output unit. If a tuner receiving the broadcasting signal through all frequency channels is not found, the controller may control the output unit to output a guide message indicating that the plurality of tuners have not been connected to the satellite antenna.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
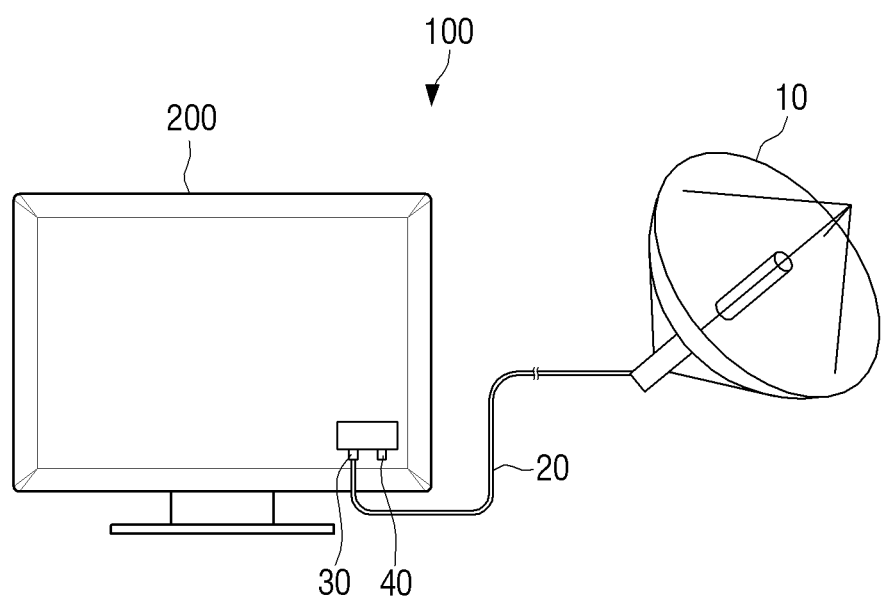
FIG. 1 is a schematic view illustrating a satellite broadcasting system according to an exemplary embodiment of the disclosure.

Reference will now be made in detail to the embodiments, examples of which are illustrated in the accompanying drawings, wherein like reference numerals refer to the like elements throughout. The embodiments are described below to explain the present invention by referring to the figures.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail because they would obscure the exemplary embodiments with unnecessary detail.

FIG. 1 is a schematic view illustrating a satellite broadcasting system 100 according to an exemplary embodiment of the disclosure.

As shown in FIG. 1, the satellite broadcasting system 100 includes a satellite antenna 10 and a display apparatus 200. The satellite antenna 10 receives a satellite broadcasting signal (hereinafter referred to as a broadcasting signal) from a satellite (not shown). The satellite antenna 10 is generally installed outside and is physically connected to the display apparatus 200 through a satellite cable 20 to transmit the received broadcasting signal to the display apparatus 200.

The display apparatus 200 is an electronic apparatus such as a smart TV, for example, and receives the broadcasting signal from the satellite antenna 10 through the satellite cable 20 physically connected to the satellite antenna 10. In detail, the display apparatus 200 includes a plurality of antenna ports 30 and 40 that are installed on a back or a side of the display apparatus 200. One of the antenna ports 30 and 40 may be connected to the satellite antenna 10 through the satellite cable 20.

If all of the antenna ports 30 and 40 receive the broadcasting signal from the satellite antenna 10 through the satellite cable 20, the display apparatus 200 may be connected to the satellite antenna 10 through a satellite repeater (not shown). In detail, the antenna ports 30 and 40 of the display apparatus 200 may be connected to the satellite repeater through the satellite cable 20, and the satellite repeater may be connected to the satellite antenna 10 through the single satellite cable 20.

Therefore, the display apparatus 200 may receive a plurality of broadcasting signals through the satellite antenna 10 and process the plurality of broadcasting signals to display the plurality of broadcasting signals in a Picture-in-Picture (PIP) form or may display a broadcasting signal received through one of the antenna ports 30 and 40 and store a broadcasting signal received through the other one of the antenna ports 30 and 40 on a recording medium.

If one of the antenna ports 30 and 40 of the display apparatus 200 is connected to the satellite antenna 10 through the satellite repeater or is directly connected to the satellite antenna 10, and a channel search command is input, the display apparatus 200 searches for one of the antenna ports 30 and 40 that receives a broadcasting signal. If broadcasting signals are received through all of the antenna ports 30 and 40 or a broadcasting signal is received through one of the antenna ports 30 and 40 connected to a tuner initially set to a main tuner, the display apparatus 200 receives a broadcasting signal of each frequency channel through the antenna port connected to the tuner initially set to the main tuner to perform a channel search.

If a broadcasting signal is received through one of the antenna ports 30 and 30 connected to a tuner initially set to a sub tuner, the display apparatus 20 changes the tuner initially set to the sub tuner into a main tuner. The display apparatus 200 receives a broadcasting signal of each frequency channel through one of the antenna ports 30 and 40 connected to the tuner changed into the main tuner to perform a channel search.

As described above, the display apparatus 200 according to the present exemplary embodiment may perform a channel search through an antenna port, which receives a broadcasting signal through the satellite antenna 10 and is connected to a tuner initially set to a sub tuner, and a tuner, which is connected to the satellite cable 20 and is connected to the corresponding antenna port The satellite broadcasting system 100 according to the disclosure has been described. Elements of the display apparatus 200 will now be described in detail.

Figure 2:
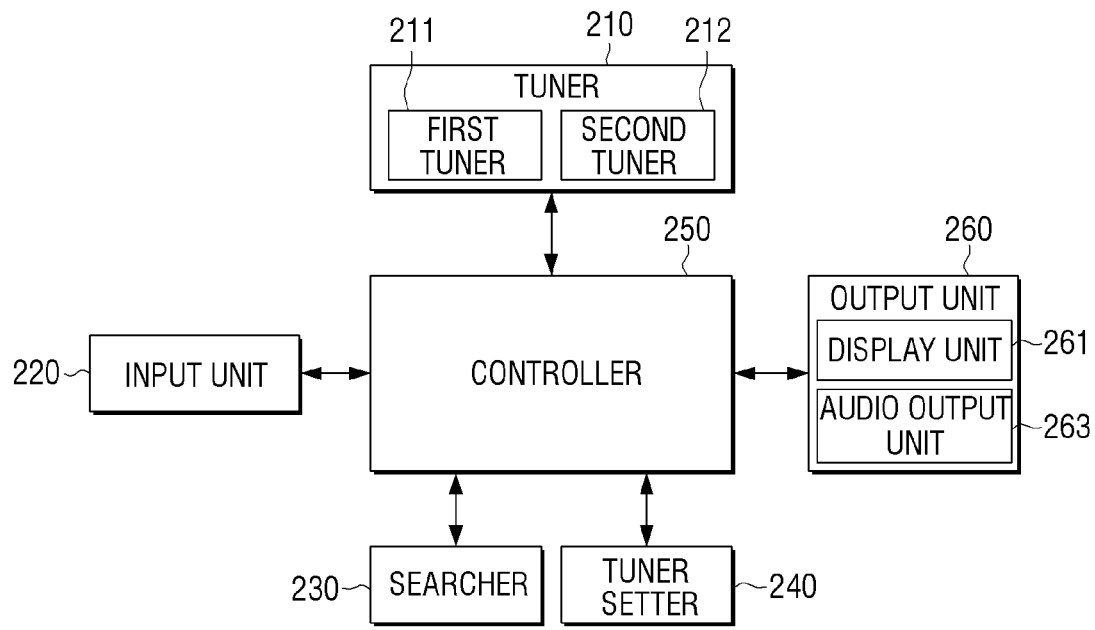
FIG. 2 is a block diagram of a display apparatus according to an exemplary embodiment of the disclosure.

FIG. 2 is a block diagram illustrating the display apparatus 200, according to an exemplary embodiment of the disclosure.

As shown in FIG. 2, the display apparatus 200 includes a tuner 210, an input unit 220, a searcher 230, a tuner setter 240, a controller 250, and an output unit 260.

The tuner 210 receives a broadcasting signal from the satellite antenna 10. A plurality of tuners 210 may be installed. In the present exemplary embodiment, the tuner 210 includes first and second tuners 211 and 212. The first tuner 211 is limited to a tuner defaulted to a main tuner, and the second tuner 212 is limited to a tuner defaulted to a sub tuner. In this case, the first tuner 211 may be a tuner that is initially set to a main tuner, and the second tuner 212 may be a tuner that is initially set to a sub tuner. The first and second tuners 211 and 212 may be respectively connected to first and second antenna ports 30 and 40. At least one of the first and second antenna ports 30 and 40 may be connected to the satellite antenna 10 through the satellite cable 20. Therefore, a tuner, which is connected to one of the first and second tuners 211 and 212 connected to the satellite antenna 10 through the satellite cable 20, may receive a broadcasting signal from the satellite antenna 10 through the corresponding antenna port.

The input unit 220 receives a user command. In particular, the input unit 220 receives a channel search command for performing a channel search based on a broadcasting signal that is received from the satellite antenna 10 through at least one of the first and second antenna ports 30 and 40 connected to the satellite antenna 10 through the satellite cable 20. As described above, the input unit 220 receives various types of user commands such as the channel search command and may be realized as an input panel. The input panel may be a touch pad type, a key pad type including various types of functional keys, numerical keys, special keys, character keys, etc., or a touch screen type, for example.

If the channel search command is input through the input unit 220, the searcher 230 searches for one of the first and second antenna ports 30 and 40 that is connected to the satellite antenna 10 to receive a broadcasting signal, wherein the first and second antenna ports 30 and 40 are respectively connected to the first and second tuners 211 and 212. According to exemplary embodiments, as described above, the first and second antenna ports 30 and 40 may be connected to the satellite antenna 10 through the satellite repeater (not shown). In this case, the first and second tuners 211 and 212 may receive broadcasting signals through the first and second antenna ports 30 and 40 that are respectively connected to the first and second tuners 211 and 212.

The first antenna port 30 may be connected to the satellite antenna 10 through the satellite cable 20. In this case, the first tuner 211 may receive a broadcasting signal through the first antenna port 30. Also, the second antenna port 40 may be connected to the satellite antenna 10 through the satellite cable 20. In this case, the second tuner 212 may receive a broadcasting signal through the second antenna port 40. As described above, at least one of the first and second antenna ports 30 and 40 may be connected to the satellite antenna 10 to receive a broadcasting signal.

If the broadcasting signal is received through at least one of the first and second antenna ports 30 and 40, the tuner setter 240 sets a tuner, which is connected to the antenna port receiving the broadcasting signal from the satellite antenna 10, to a main tuner. If one of the first and second tuners 211 and 212 is set to a main tuner through the tuner setter 240 as described above, the controller 250 performs a channel search with respect to each preset frequency channel through the tuner set to the main tuner to select a frequency channel through which an effective broadcasting signal is received. The controller 250 also controls overall operations of elements of the display apparatus 200.

The searcher 230 will now be described in detail.

Figure 3:
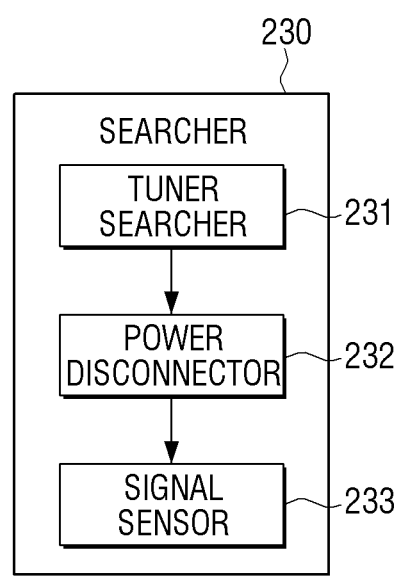
FIG. 3 is a block diagram illustrating a detailed structure of a searcher according to an exemplary embodiment of the disclosure.

FIG. 3 is a block diagram illustrating a detailed structure of the searcher 230, according to an exemplary embodiment of the disclosure.

As shown in FIG. 3, the searcher 230 includes a tuner searcher 231, a power disconnector 232, and a signal sensor 233.

The tuner searcher 231 selects an arbitrary frequency channel by using the first and second tuners 211 and 212 to search for a tuner that receives a broadcasting signal through the corresponding frequency channel. If one of the first and second tuners 211 and 212 that has received the broadcasting signal is found, the power disconnector 232 disconnects a power supply to the found tuner. The signal sensor 233 re-determines whether the broadcasting signal has been received through the tuner to which the power supply has been disconnected.

For example, a frequency channel may be set in the unit of 10 MHz within a frequency band between 100 MHz and 1000 MHz. In this case, the tuner searcher 231 selects an initial frequency channel of 100 MHz by using the first and second tuners 211 and 212 according to the channel search command to determine whether the broadcasting signal has been received through at least one of the first and second tuners 211 and 212.

If it is determined that the broadcasting signal has not been received through the first and second tuners 211 and 212, the tuner searcher 231 searches for a next frequency channel. If the broadcasting signal is not received through the frequency channel of 100 MHz by using the first and second tuners 211 and 212 as described above, the tuner searcher 231 searches for one of the first and second tuners 211 and 212 that receives a broadcasting signal through a frequency channel of 110 MHz that is a next frequency channel. If a tuner that receives a broadcasting signal through all frequency channels is not found, the controller 250 determines that the first and second antenna ports 30 and 40 connected to the first and second tuners 211 and 212 have not been connected to the satellite antenna 10. Therefore, the controller 250 controls an output unit 260 to output a guide message indicating that the first and second antenna ports 30 and 40 connected to the first and second tuners 211 and 212 have not been connected to the satellite antenna 10.

The output unit 260 may output a guide message "Cable has not been connected." as an image having a voice or text form according to a control command. For this purpose, the output unit 260 may include a display unit 261 and an audio output unit 263. The display unit 261 may be realized as a liquid crystal display (LCD), an organic light-emitting display (OLED), a plasma display panel (PDP), or the like to provide various types of display screens that may be provided through the display apparatus 200. In particular, as described above, the display unit 261 may display a guide message "Cable has not been connected." in a text or image form. The audio output unit 263 may be realized as an output port, such as a speaker, a jack, or the like, to output the guide message "Cable has not been connected." in an audible sound form.

If one of the first and second tuners 211 and 211 receiving a broadcasting signal is found, the power disconnector 232 disconnects a power supply to the tuner that receives the broadcasting signal. As described above, the satellite antenna 10 may be connected to an antenna port connected to at least one of the first and second tuners 211 and 212, through the satellite cable 20. For example, the satellite antenna 10 may be connected to the first antenna port 30 through the satellite cable 20. In this case, the satellite antenna 10 is supplied with power through the first tuner 211 connected to the first antenna port 30 through the satellite cable 20. Therefore, the satellite antenna 10 may perform an operation by using the power supplied through the first tuner 211 to receive a broadcasting signal from a satellite.

Therefore, if one of the first and second tuners 211 and 212 receiving the broadcasting signal is found, the power disconnector 232 determines that power has been supplied to the satellite antenna 10 through the found tuner and disconnects the power supplied to the tuner receiving the broadcasting signal. If the power supplied to the tuner receiving the broadcasting signal is disconnected, the signal sensor 233 determines whether the broadcasting signal has been received through the tuner from which the supply of the power is disconnected. Due to the performance of the above-described operation, a broadcasting signal received by another tuner is transmitted to the tuner from which the power supply is disconnected or the tuner from which the power supply is disconnected may receive the broadcasting signal due to an occurrence of hardware noise. Therefore, the signal sensor 233 determines whether the broadcasting signal has been received through the tuner from which the power supply is disconnected, according to an event.

If the broadcasting signal is not received through the tuner from which the power supply is disconnected, the tuner setter 240 may set the tuner from which the power supply is disconnected, to a main tuner.

According to exemplary embodiments, the tuner searcher 231 may search that a broadcasting signal has been received through all of the first and second tuners 211 and 212. In this case, the power disconnector 232 disconnects power supplies to the first and second tuners 211 and 212. The signal sensor 233 determines whether the broadcasting signal has not been received through the first and second tuners 211 and 212 from which power supplies are disconnected. If it is determined that the broadcasting signal has not been received through the first and second tuners 211 and 212, the tuner setter 240 sets one of the first and second tuners 211 and 212, which is set to default, to a main tuner. As described above, the first tuner 211 may be defaulted to a main tuner, and the second tuner 212 may be defaulted to a sub tuner. Therefore, if it is determined that the broadcasting signal has not been received through the first and second tuners 211 and 212 from which the power supplies are disconnected, the tuner setter 240 may keep the first tuner 211 as the main tuner. Accordingly, the controller 250 may perform a channel search through the first tuner 211 defaulted to the main tuner.

If it is determined that the broadcasting signal has not been received when the power supply to the first or second tuner 211 or 212 is disconnected, the tuner setter 240 sets a tuner, which has not received a broadcasting signal, to a main tuner.

According to exemplary embodiments, the tuner searcher 231 may determine the broadcasting signal has been received through the first tuner 211 of the first and second tuners 211 and 212. In this case, the power disconnector 232 disconnects power supplied to the first tuner 211. If it is determined that the broadcasting signal has not been received through the first tuner 211 from which the power supply is disconnected, through the signal sensor 233, the tuner setter 240 may keep the first tuner 211 as the main tuner. Therefore, the controller 250 may perform a channel search through the first tuner 211 defaulted to the main tuner.

The tuner searcher 231 may determine the broadcasting signal has been received through the second tuner 212 of the first and second tuners 211 and 212. In this case, the power disconnector 232 disconnects power supplied to the second tuner 212. If it is determined that the broadcasting signal has not been received through the second tuner 212 from which power supply has been disconnected, through the signal sensor 233, the tuner setter 240 changes the second tuner 212 defaulted to the sub tuner into a main tuner. Therefore, the controller 250 may perform a channel search through the second tuner 212 changed from the sub tuner into the main tuner.

If it is determined that the broadcasting signal has been received when a power supply is disconnected from at least one of the first and second tuners 211 and 212, the controller 250 controls the searcher 230 to search for a next frequency channel. As described above, the tuner searcher 231 may determine a broadcasting signal has been received through at least one of the first and second tuners 211 and 212. In this case, the power disconnector 232 disconnects power supplied to one of the first and second tuners 211 and 212 that receives a broadcasting signal. If it is determined that the broadcasting signal has been received through the tuner from which power supply has been disconnected, through the signal sensor 233, the controller 250 controls the searcher 230 to search for a next frequency channel. Therefore, the tuner searcher 231 searches for a tuner that receives a broadcasting signal through the next frequency channel, and the power disconnector 232 disconnects power supplied to the found tuner. The signal sensor 233 may determine whether a broadcasting signal has been received through the tuner from which the power supply has been disconnected.

A detailed structure of the display apparatus 200 will now be described in detail.

Figure 4:
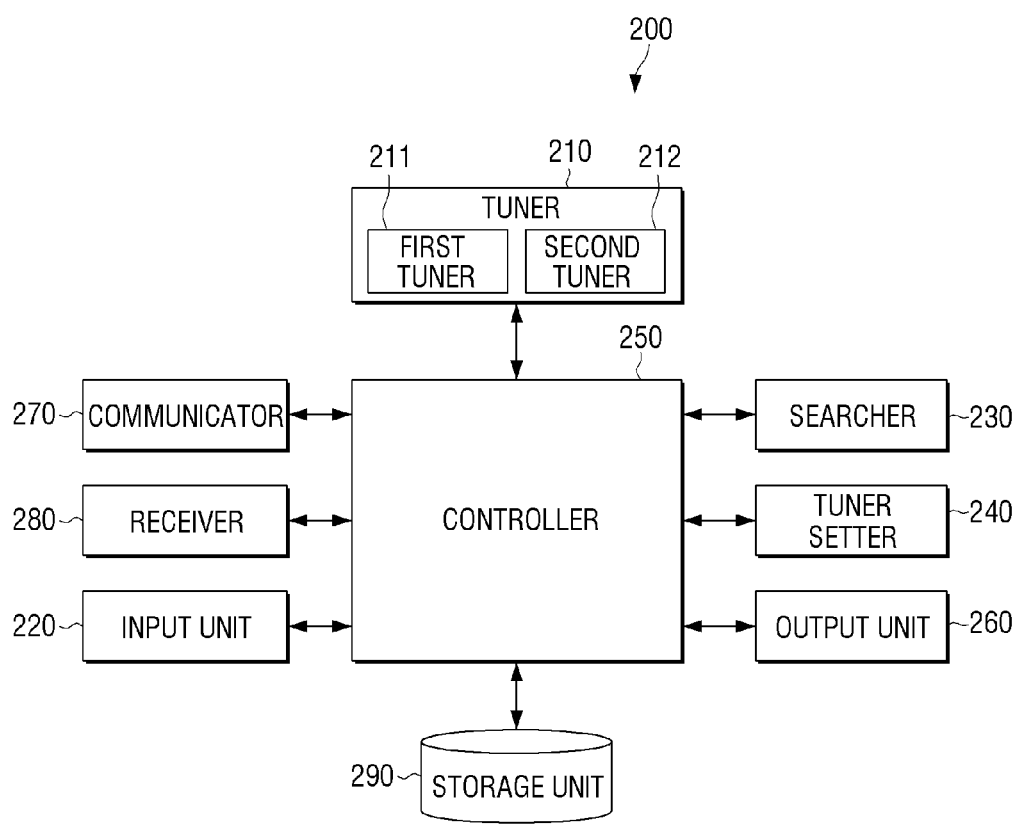
FIG. 4 is a block diagram illustrating a detailed structure of a display apparatus according to an exemplary embodiment of the disclosure.

FIG. 4 is a block diagram illustrating a detailed structure of the display apparatus 200, according to an exemplary embodiment of the disclosure.

As shown in FIG. 4, the display apparatus 200 further includes a communicator 270, a receiver 280, and a storage unit 290 besides the elements of FIG. 2.

The communicator 270 communicates with a network (not shown). In detail, the communicator 270 may communicate with various types of external apparatuses (for example, another terminal apparatus or a server) connected to the network by using a network address allocated to the display apparatus 200 for a network communication. Here, the network address may be an Internet Protocol (IP) address. Therefore, the communicator 270 may communicate with an external apparatus connected to the Internet by using an IP address to receive various types of contents.

According to exemplary embodiments, the communicator 270 may communicate with the network by using various types of communication methods such as wire/wireless Local Area Network (LAN), WiFi, WAN, Ethernet, Bluetooth, Zigbee, a universal serial bus (USB), IEEE 1394, etc. For this purpose, the communicator 270 may include various types of communication modules for performing the network communication according to the communication methods. For example, if the communicator 270 performs a communication by using the wire LAN method, the communicator 270 may include an LAN card (not shown). If the communicator 270 performs a communication, the communicator 270 may include a WiFi communication chip (not shown).

As described above, the display apparatus 200 may receive a broadcasting signal from the satellite antenna 10 through the tuner 210 and receive a broadcasting content (broadcasting signal), such as terrestrial broadcasting or cable broadcasting, from a broadcasting station. Therefore, the controller 250 may perform operations, such as decoding, scaling, and a frame rate conversion, with respect to an image of the broadcasting content received through the receiver 280 or an image of the broadcasting signal received through at least one of the first and second tuners 211 and 212 to perform signal-processing with respect to the image in a form that may be output by the display unit 261. The controller 250 may perform signal-processing, such as decoding or the like, with respect to an audio of the broadcasting content received through the receiver 280 or an audio of the broadcasting signal received through at least one of the first and second tuners 211 and 212 to perform signal-processing with respect to the audio in a form that may be output by the audio output unit 263.

The storage unit 290 may store various types of data for driving and controlling the display apparatus 200, an operating system (OS), and a program for executing a basic service function (for example, a content search function, a program search function, or the like) that may be provided from the display apparatus 200. The storage unit 290 may store a content received from an external apparatus through the communicator 270 and an application program that is downloaded to execute the corresponding content. The storage 290 may search for each preset frequency channel through a tuner set to a main tuner to store channel information about a selected frequency channel. For this purpose, the storage unit 290 may be realized as a flash memory, a non-volatile memory such as an electrically erasable read only memory (EEROM), or a storage medium such as a hard disk or the like.

Besides the above-described elements, the display apparatus 200 may further include a remote control signal receiver (not shown) and an interface unit (not shown). The remote control signal receiver receives a remote control signal for controlling an operation of the display apparatus 200 from a remote controller (not shown). Therefore, the controller 250 may control the operation of the display apparatus 200 based on a control signal received through the remote control signal receiver.

The interface unit connects the display apparatus 200 to various types of external apparatuses (not shown). The interface unit may transmit a content or the like stored in the display apparatus 200 to an external apparatus connected to the display apparatus 200 or receive a content or the like from the corresponding external apparatus. For this purpose, the interface unit may include at least one of a High-Definition Multimedia Interface (HDMI) input terminal, a component input terminal, a personal computer (PC) input terminal, or a USB input terminal.

The elements of the display apparatus 200 have been described in detail. A method of performing a channel search in the display apparatus will now be described in more detail.

Figure 5:
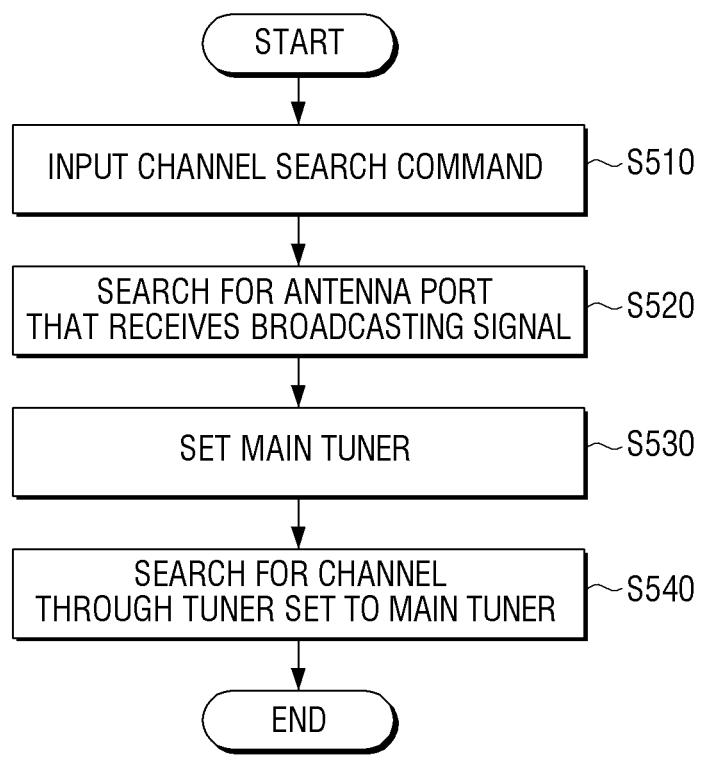
FIG. 5 is a flowchart illustrating a method of searching for a channel in a display apparatus, according to an exemplary embodiment of the disclosure.

FIG. 5 is a flowchart illustrating a method of performing a channel search in the display apparatus 200, according to an exemplary embodiment of the disclosure.

As shown in FIG. 5, the display apparatus 200 includes a plurality of tuners (hereinafter referred to as first and second tuners) and a plurality of antenna ports that are respectively connected to the first and second tuners. In detail, as described with reference to FIG. 1, at least one of the plurality of antenna ports respectively connected to the first and second tuners may be directly connected to the satellite antenna 10 through the satellite cable 20 or may be connected to the satellite antenna 10 through a satellite repeater (not shown). When the at least one of the plurality of antenna ports respectively connected to the first and second tuners is connected to the satellite antenna 10, the display apparatus 200 receives a channel search command according to a request of a user in operation S510. If the channel search command is input, the display apparatus 200 searches for one of the plurality of antenna ports that is connected to the satellite antenna 10 to receive a broadcasting signal in operation S520.

If it is determined that one of the plurality of antenna ports is connected to the satellite antenna 10 to receive the broadcasting signal, the display apparatus 200 sets one of the first and second tuners, which is connected to the antenna port receiving the broadcasting signal, to a main tuner in operation S530. In operation S540, the display apparatus 200 performs a channel search through the tuner set to the main tuner.

An operation of the display apparatus 200 for setting a tuner, which is connected to one of a plurality of antenna ports receiving a broadcasting signal, to a main tuner will now be described in more detail.

Figure 6:
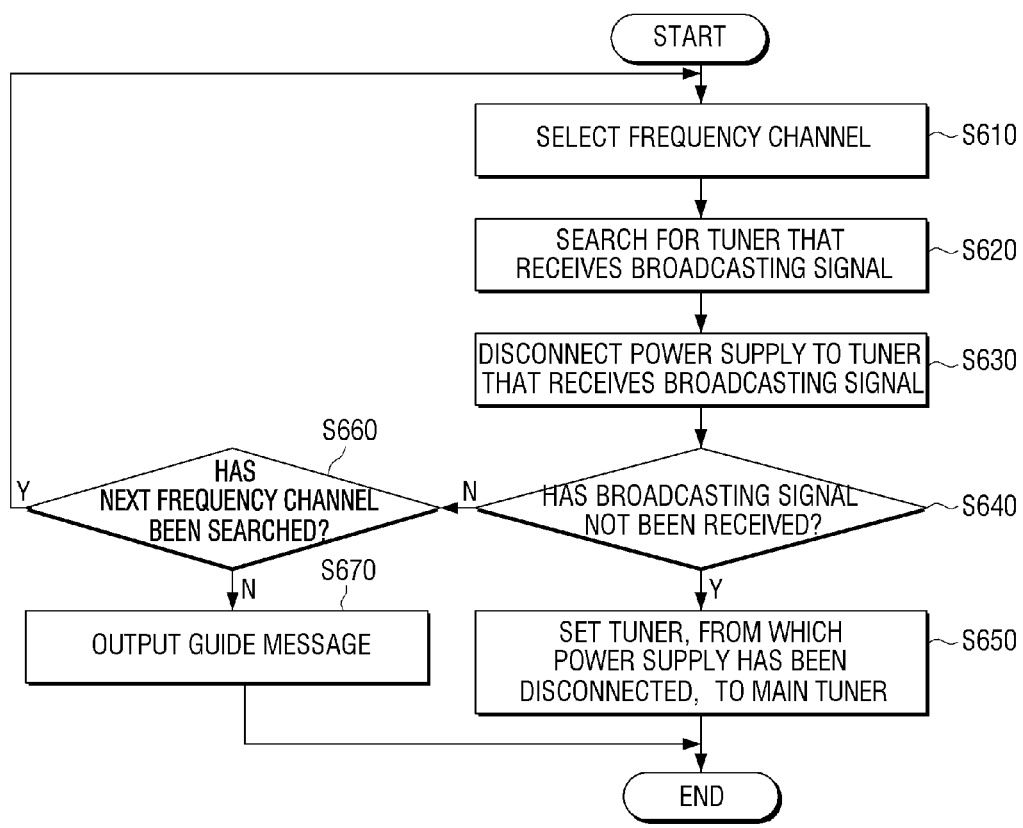
FIG. 6 is a flowchart illustrating a method of setting one of a plurality of tuners to a main tuner in a display apparatus, according to an exemplary embodiment of the disclosure.

FIG. 6 is a flowchart illustrating a method of setting one of a plurality of tuners to a main tuner in the display apparatus 200, according to an exemplary embodiment of the disclosure.

As shown in FIG. 6, in operation S610, the display apparatus 200 selects arbitrary frequency channels by using first and second tuners according to a channel search command. In operation S620, the display apparatus 200 searches for one of the first and second tuners that receives a broadcasting signal through an arbitrary frequency channel. If the tuner receiving the broadcasting signal through the arbitrary frequency channel is found, the display apparatus 200 disconnects a power supply to the found tuner in operation S630. In operation S640, the display apparatus 200 determines whether the broadcasting signal has been received through the tuner from which the power supply has been disconnected. If it is determined in operation S640 that the broadcasting signal has not been received through the tuner from which the power supply has been disconnected, the display apparatus 200 sets the tuner, from which the power supply has been disconnected, to a main tuner in operation S650.

If it is determined in operation S640 that the broadcasting signal has been received through the tuner from which the power supply has been disconnected, the display apparatus 200 determines whether there is a next frequency channel that is to be selected through the first and second tuners according to a preset condition in operation S660. If it is determined in operation S660 that there is the next frequency channel that is to be selected, the display apparatus 200 re-performs operations S610 through S640 to set the tuner, from which the power supply has been disconnected, to a main tuner.

If it is determined in operation S660 that there is no next frequency channel that is to be selected through the first and second tuners, the display apparatus 200 determines that the antenna ports respectively connected to the first and second tuners have not been connected to the satellite antenna 10 and outputs a guide message "Cable has not been connected." in operation S670. Therefore, a user may check that the satellite cable 20 has not been connected to at least one of the antenna ports respectively connected to the first and second tuners, through the guide message output through the display apparatus 200 and connect the satellite cable 20 to the at least one antenna port.

A method of setting one of a plurality of tuners to a main tuner in the display apparatus 200 will now be described in more detail.

Figure 7:
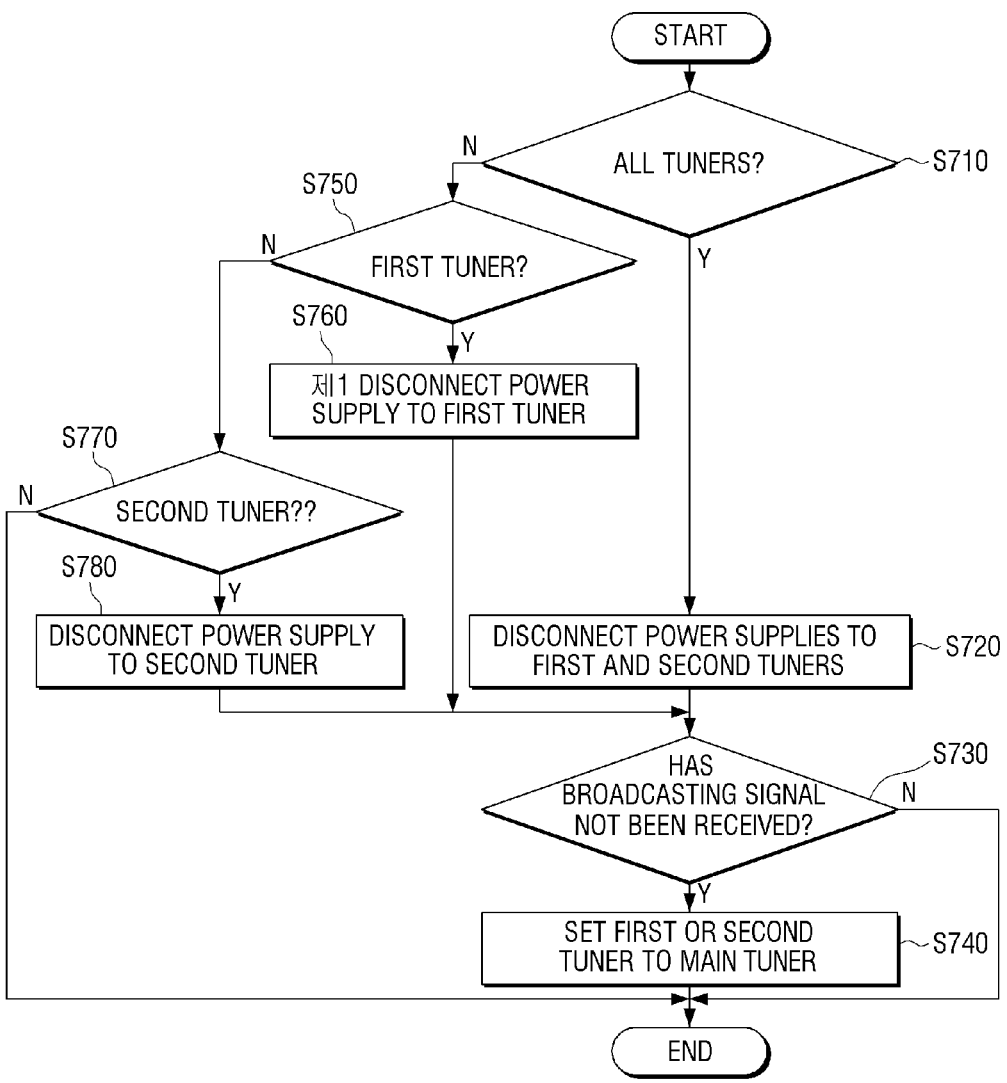
FIG. 7 is a flowchart illustrating a detailed method of setting one of a plurality of tuners to a main tuner in a display apparatus, according to an exemplary embodiment of the disclosure.

FIG. 7 is a flowchart illustrating a detailed method of setting one of a plurality of tuners to a main tuner in the display apparatus 200, according to an exemplary embodiment of the disclosure.

As shown in FIG. 7, if it is determined that a broadcasting signal has been received through first and second tuners in operation S710, the display apparatus 200 disconnects power supplies to the first and second tuners that receive the broadcasting signal in operation S720. When the power supplies are disconnected from the first and second tuners, the display apparatus 200 determines whether the broadcasting signal has been received through the first and second tuners from which the power supplies have been disconnected, in operation S730. If it is determined in operation S730 that the broadcasting signal has been received through at least one of the first and second tuners, the display apparatus 200 determines whether to search for a next frequency channel through operation S660 of FIG. 6 described above. If it is determined that the broadcasting signal has not been received through the first and second tuners from which the power supplies have been disconnected, the display apparatus 200 sets one of the first and second tuners to a main tuner in operation S740.

According to exemplary embodiments, the first tuner may be defaulted to a main tuner, and the second tuner may be defaulted to a sub tuner. In other words, the first tuner may be initially set to a main tuner, and the second tuner may be initially set to a sub tuner.

Therefore, if it is determined that the broadcasting signal has not been received through the first and second tuners, the display apparatus 200 determines that antenna ports respectively connected to the first and second tuners have been connected to the satellite antenna 10 through the satellite cable 20. Accordingly, the display apparatus 200 keeps the first tuner defaulted to the main tuner as the main tuner and performs a channel search through the first tuner kept as the main tuner.

If it is determined in operation S710 that the broadcasting signal has been received through one of the first and second tuners, the display apparatus 200 determines whether a tuner receiving the broadcasting signal is the first tuner in operation S750. If it is determined in operation S750 that the tuner receiving the broadcasting signal is the first tuner, the display apparatus 200 disconnects a power supply to the first tuner receiving the broadcasting signal in operation S760. The display apparatus 200 determines whether the broadcasting signal has been received through the first tuner from which the power supply has been disconnected, through operation S730 and, if it is determined that the broadcasting signal has been received through the first tuner, determines whether to search for a next frequency channel through operation S660 of FIG. 6 described above. If it is determined that the broadcasting signal has not been received through the first tuner from which the power supply has been disconnected, the display apparatus 200 determines that an antenna port connected to the first tuner has been connected to the satellite antenna 10 through the satellite cable 20. Therefore, the display apparatus 200 keeps the first tuner defaulted to the main tuner in operation S740 as the main tuner and selects a channel through the first tuner kept as the main tuner.

If it is determined in operation S750 that the broadcasting signal has not been received through the first tuner, the display apparatus 200 determines whether a tuner that has received the broadcasting signal is the second tuner in operation S770. If it is determined in operation S770 that the broadcasting signal has not been received through the second tuner, the display apparatus 200 determines whether to search for a next frequency channel through operation S660 of FIG. 6 described above.

If it is determined that the broadcasting signal has been received through the second tuner, the display apparatus 200 disconnects a power supply to the second tuner that receives the broadcasting signal, in operation S780. The display apparatus 200 determines whether the broadcasting signal has been received through the second tuner from which the power supply has been disconnected, through operation S730 and, if it is determined that the broadcasting signal has been received through the second tuner, determines whether to search for a next frequency channel through operation S660 of FIG. 6 described above. If it is determined that the broadcasting signal has not been received through the second tuner from which the power supply has been disconnected, the display apparatus 200 determines that an antenna port connected to the second tuner has been connected to the satellite antenna 10 through the satellite cable 20. Therefore, the display apparatus 200 may change the second tuner defaulted to the sub tuner into a main tuner through operation S740 and select a channel through the second channel changed into the main tuner.

According to various exemplary embodiments of the disclosure as described above, if an antenna port, which is connected to one of a plurality of tuners initially set to a sub tuner, is connected to a satellite cable, a display apparatus may set the tuner initially set to the sub tuner to a main tuner. Therefore, although the antenna port connected to the tuner of the plurality of tuners initially set to the sub tuner is connected to a satellite antenna through the satellite cable, the display apparatus may perform a channel search through the corresponding tuner.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of searching for a channel in a display apparatus comprising a plurality of tuners and a plurality of antenna ports respectively connected to the plurality of tuners, the method comprising:
   receiving a channel search command;
   searching for one of the plurality of antenna ports that is connected to a satellite antenna to receive a broadcasting signal;
   setting the one of the plurality of tuners connected to the one antenna port to a main tuner; and
   performing a channel search through the tuner set to the main tuner,
   wherein the searching for one of the plurality of antenna ports comprises disconnecting a power supply to one of the plurality of tuners, and re-determining whether a broadcasting signal has been received through the tuner from which the power supply has been disconnected.

2. The method of claim 1, wherein the searching for one of the plurality of antenna ports further comprises:
   selecting a frequency channel by using the plurality of tuners; and
   searching for one of the plurality of tuners that receives a broadcasting signal in the frequency channel.

3. The method of claim 2, wherein the plurality of tuners comprise first and second tuners, and the setting of the one of the plurality of tuners comprises: if power supplies to the first and second tuners are disconnected, and it is re-determined that the first and second tuners have not received the broadcasting signal, setting one of the first and second tuners to the main tuner.

4. The method of claim 3, wherein the setting of the one of the plurality of tuners further comprises:
   if it is re-determined that a power supply to the first or second tuner has been disconnected, and the broadcasting signal has not been received, setting a tuner not receiving the broadcasting signal to the main tuner.

5. The method of claim 4, further comprising:
   if it is re-determined that a power supply to at least one of the first and second tuners has been disconnected, and the at least one tuner has received the broadcasting signal, searching for a next frequency channel.

6. The method of claim 2, wherein the searching for one of the plurality of tuners further comprises:
   if one of the plurality of tuners receiving the broadcasting signal is not found, searching for a next frequency channel.

7. The method of claim 6, further comprising:
   if a tuner receiving a broadcasting signal through all frequency channels is not found, outputting a guide message indicating that the antenna ports respectively connected to the plurality of tuners have not been connected to the satellite antenna.

8. The method of claim 1, wherein the plurality of tuners comprise a first tuner that is defaulted to a main tuner and a second tuner that is defaulted to a sub tuner,
   wherein the searching for one of the plurality of tuners comprises:
   selecting one frequency channel by using the first and second tuners;
   if a broadcasting signal is received through the first tuner, disconnecting a power supply to the first tuner and re-determining whether the broadcasting signal has been received;
   if it is determined that the broadcasting signal has been received through the first tuner, selecting a next frequency channel;
   if it is re-determined that the broadcasting signal has not been received through the first tuner, determining whether the broadcasting signal has been received through the second tuner;
   if the broadcasting signal has not been received through the second tuner, keeping the first tuner as the main tuner, and if the broadcasting signal has been received through the second tuner, disconnecting a power supply to the second tuner, and re-determining whether the broadcasting signal has been received; and
   if it is determined that the broadcasting signal has not been received through the second tuner, determining both of the first and second tuners have been connected to the satellite antenna, keeping the first tuner as the main tuner, and if it is re-determined that the broadcasting signal has been received through the second tuner, selecting a next frequency channel.

9. The method of claim 8, wherein the searching for the one of the plurality of tuners comprises:
   if the broadcasting signal has not been received through the first tuner, and the broadcasting signal has been received through the second tuner, disconnecting a power supply to the second tuner and re-determining whether the broadcasting signal has been received; and if it is re-determined that the broadcasting signal has been received through the second tuner, selecting a next frequency channel, wherein if it is re-determined that the broadcasting signal has not been received through the second tuner, the second tuner is set to the main tuner.

10. A display apparatus comprising:
a plurality of tuners configured to receive a broadcasting signal;
a searcher configured to search for one of a plurality of antenna ports that is connected to a satellite antenna to receive the broadcasting signal according to a channel search command, wherein the plurality of antenna ports are respectively connected to the plurality of tuners;
a tuner setter configured to set one of the plurality of tuners connected to the one antenna port to a main tuner if the one of the plurality of antenna ports is connected to the satellite antenna to receive the broadcasting signal; and
a controller configured to perform a channel search through the tuner set to the main tuner,
wherein the searcher comprises a power disconnector configured to disconnect a power supply to one of the plurality of tuners, and a signal sensor configured to re-determine whether the broadcasting signal has been received through the tuner from which the power supply has been disconnected.

11. The display apparatus of claim 10, wherein the searcher further comprises:
a tuner searcher configured to select a frequency channel by using the plurality of tuners to search for one of the plurality of tuners that receives a broadcasting signal through the frequency channel.

12. The display apparatus of claim 11, wherein the plurality of tuners comprise first and second tuners, wherein if power supplies to the first and second tuners are disconnected, and the first and second tuners have not received the broadcasting signal, the tuner setter sets one of the plurality of tuners, which is set to default, to the main tuner.

13. The display apparatus of claim 12, wherein if a power supply to the first or second tuner is disconnected, and the first or second tuner has not received the broadcasting signal, the tuner setter sets a tuner not receiving the broadcasting signal to the main tuner.

14. The display apparatus of claim 13, wherein if a power supply to at least one of the first and second tuners is disconnected, and it re-determined that the broadcasting signal has been received, the controller controls the searcher to search for a next frequency channel.

15. The display apparatus of claim 11, wherein if one of the plurality of tuners receiving the broadcasting signal is not found, the tuner searcher searches for a next frequency channel.

16. The display apparatus of claim 15, further comprising:
an output unit,
wherein if a tuner receiving the broadcasting signal through all frequency channels is not found, the controller controls the output unit to output a guide message indicating that the plurality of tuners have not been connected to the satellite antenna.

17. A method of setting a main tuner in an apparatus comprising a plurality of tuners, the method comprising:
disconnecting a power supply to one of the plurality of tuners;
determining, by a processor, whether a broadcast signal is received through the one of the plurality of tuners when the power supply is disconnected; and
setting the one of the plurality of tuners which does not receive the broadcast signal when the power supply is disconnected as the main tuner.

* * * * *

UNITED STATES PATENT AND TRADEMARK OFFICE
CERTIFICATE OF CORRECTION

PATENT NO. : 8,982,282 B2  
APPLICATION NO. : 14/248694  
DATED : March 17, 2015  
INVENTOR(S) : Jun-hee Woo Page 1 of 1

It is certified that error appears in the above-identified patent and that said Letters Patent is hereby corrected as shown below:

In the Claims

Column 16, Line 13, In Claim 14, delete "it" and insert -- it is --, therefor.

Signed and Sealed this  
Twenty-first Day of July, 2015

Michelle K. Lee  
*Director of the United States Patent and Trademark Office*